（12）United States Patent
Anderson et al.

(10) Patent No.: US 7,768,519 B1
(45) Date of Patent: Aug. 3, 2010

(54) HIGH-PERFORMANCE CROSSBAR FOR HIGH THROUGHPUT PIPELINES

(75) Inventors: David L. Anderson, Durham, NC (US); Mark J. French, Raleigh, NC (US)

(73) Assignee: NVIDIA Corporation, Santa Clara, CA (US)

( * ) Notice: Subject to any disclaimer, the term of this patent is extended or adjusted under 35 U.S.C. 154(b) by 988 days.

(21) Appl. No.: 11/533,293

(22) Filed: Sep. 19, 2006

(51) Int. Cl.
G06F 15/80 (2006.01)
G06F 13/00 (2006.01)
G06F 9/46 (2006.01)
(52) U.S. Cl. .................. 345/505; 345/537; 718/105
(58) Field of Classification Search ............ 345/505, 345/506, 502, 501, 530, 536, 537, 545, 544; 718/105
See application file for complete search history.

(56) References Cited

U.S. PATENT DOCUMENTS

| | | | | |
|---|---|---|---|---|
| 5,794,016 A | * | 8/1998 | Kelleher | 345/505 |
| 5,916,309 A | * | 6/1999 | Brown et al. | 710/52 |
| 5,940,086 A | * | 8/1999 | Rentschler et al. | 345/503 |
| 6,020,900 A | * | 2/2000 | Flurry et al. | 345/558 |
| 7,123,623 B2 | * | 10/2006 | Sharma et al. | 370/413 |
| 7,129,962 B1 | * | 10/2006 | Cote et al. | 345/643 |

* cited by examiner

Primary Examiner—Joni Hsu
(74) Attorney, Agent, or Firm—Patterson & Sheridan, LLP

(57) ABSTRACT

A high-performance crossbar for a pipeline is disclosed. In particular, one embodiment of the crossbar receives multimedia data at a first throughput from a source operating in a first pipeline stage. The received data are stored in at least one input buffer corresponding to the source in the crossbar. The crossbar also causes the multimedia data from the input buffer to be routed to at least one output buffer at a second throughput. The output buffer corresponds to a destination operating in a second pipeline stage. Then the crossbar causes the multimedia data from the output buffer to be routed to the destination at the first throughput.

20 Claims, 6 Drawing Sheets

HIGH-PERFORMANCE CROSSBAR FOR HIGH THROUGHPUT PIPELINES

BACKGROUND OF THE INVENTION

1. Field of the Invention

Embodiments of the present invention relate generally to a parallel and pipelined graphics architecture and more specifically to a high-performance crossbar in a graphics pipeline.

2. Description of the Related Art

Unless otherwise indicated herein, the approaches described in this section are not prior art to the claims in this application and are not admitted to be prior art by inclusion in this section.

A graphics system generally adopts a highly parallel and pipelined architecture to meet the ever increasing demands for realism, quality, and real-time interactivity of displayed images and videos. FIG. 1A is a conceptual diagram of a graphics rendering pipeline, 100. Geometry processing block 102 receives geometry primitives, typically triangles, from a graphics application and conducts geometric transforms as specified by the graphics application. The output of geometry processing block 102 includes triangles transformed and projected onto a two dimensional surface, referred to as "screen space," corresponding to a window on the viewer's screen. The geometric primitives in screen space emitted by geometry processing block 102 are decomposed by rasterization block 104 into fragments, corresponding to screen space pixels that are least partially covered by the geometric primitives. Additionally, rasterization block 104 determines the screen space coverage and alignment of each geometric primitive with respect to memory tiles, each of which refers to a contiguous span of memory within a certain partition of frame buffer 110. Shader 106 receives fragments from rasterization block 104 and processes the fragments according to shading instructions specified by the graphics application or otherwise. The processed fragments are transmitted to Raster OPerations ("ROP") block 108 for further processing. ROP block 108 conducts any depth and stencil testing on the shaded pixels, as specified by the graphics application. Pixels surviving depth and stencil testing are written to frame buffer 110. Video refresh block 112 then scans out the data stored in frame buffer 110 to a display device.

To determine the final surface properties of an object or image, some of the functions performed by shader 106 include texture mapping and texture blending. In one implementation, shader 106 may include multiple texture processing clusters ("TPC") operating in parallel, and ROP block 108 may also include multiple ROP units operating in parallel. Each of the TPCs generally retrieves and combines appropriate texels with interpolated color values and directs transaction requests corresponding to the shaded pixels to the ROP units. Each ROP unit corresponds to a particular partition in frame buffer 110. For M TPCs to transfer data to N ROP units efficiently, one approach is to use the crossbar architecture of FIG. 1B to route data from any one of the M TPCs to any one of the N ROP units. As an illustration, suppose TPC 1 intends to send the processed fragment to ROP unit 1, because the memory tiles associated with this fragment reside in the frame buffer partition that corresponds to ROP unit 1. TPC 1 sends the transaction request corresponding to the processed fragment to crossbar 150, and crossbar 150 arbitrates among the various transaction requests generated by other TPCs and routes the data to ROP unit 1.

One problem occurs when two or more TPCs transmit requests to send data to the same ROP unit. Suppose TPC 1 and TPC 2 both transmit requests to send data to ROP unit 1. Crossbar 150 is configured to service only one of these two requests and block the other. This act of blocking in effect generates a stall at the input of crossbar 150 and consequently impedes the processing of the subsequent stages of graphics rendering pipeline 100 of FIG. 1A. Another problem occurs when there is uneven distribution of work among the ROP units. For example, if all of the M TPCs attempt to send data to ROP unit 1 only, then ROP unit 2 to ROP unit N are potentially idle for M clock cycles. Each idling clock cycle for a ROP unit is also referred to as a "bubble." The more bubbles exist in a parallel system the more resources in the system are not being fully utilized, resulting in the degradation of the overall performance of the system.

As the foregoing illustrates, what is needed is an improved crossbar architecture that addresses one or more of the aforementioned performance problems.

SUMMARY OF THE INVENTION

A high-performance crossbar for a pipeline is disclosed. In particular, one embodiment of the crossbar receives multimedia data at a first throughput from a source operating in a first pipeline stage. The received data are stored in at least one input buffer corresponding to the source in the crossbar. The crossbar also causes the multimedia data from the input buffer to be routed to at least one output buffer at a second throughput. The output buffer corresponds to a destination operating in a second pipeline stage. Then the crossbar causes the multimedia data from the output buffer to be routed to the destination at the first throughput.

One advantage of the disclosed crossbar architecture is that it at least alleviates the undesirable blocking effects and eliminates bubbles in a parallel and pipelined system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A high-performance crossbar for a pipeline is described. In the following description, for the purposes of explanation, numerous specific details are set forth in order to provide a thorough understanding of the present invention. It will be apparent, however, to one skilled in the art that the present invention may be practiced without these specific details.

Throughout this disclosure, a "multi-cycle" data unit generally refers to a data unit that has been decomposed into multiple subunits and takes multiple clock cycles to receive all the subunits to assemble the entire data unit. A "state bundle" broadly refers to a bundle that encapsulates the state information in a pipeline stage.

Figure 1A:
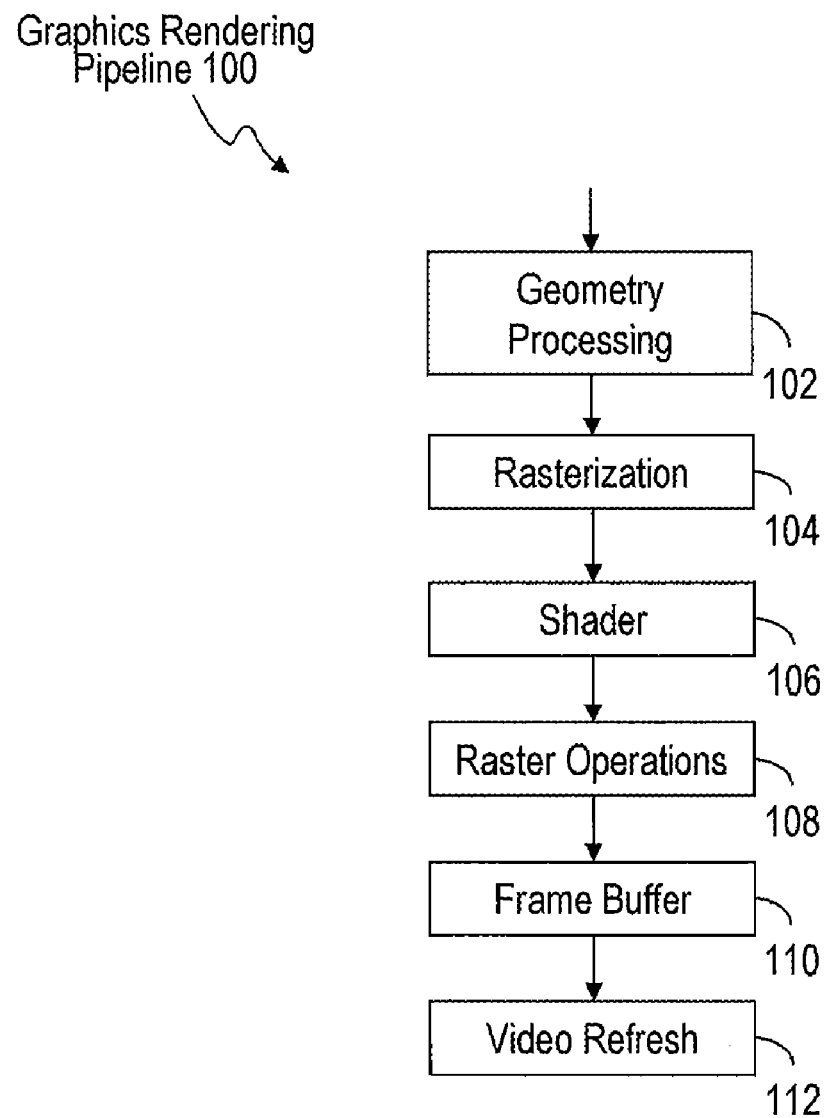
FIG. 1A is a conceptual diagram of a graphics rendering pipeline.
Figure 1B:
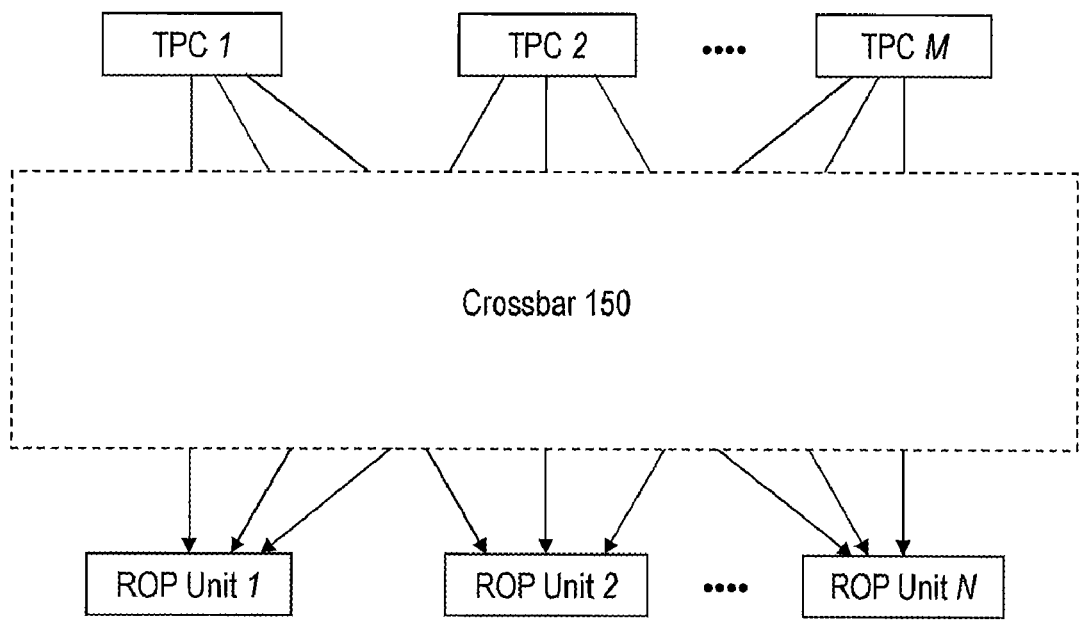
FIG. 1B is a conceptual diagram of a crossbar architecture that routes data from M TPCs to N ROP units.
Figure 2:
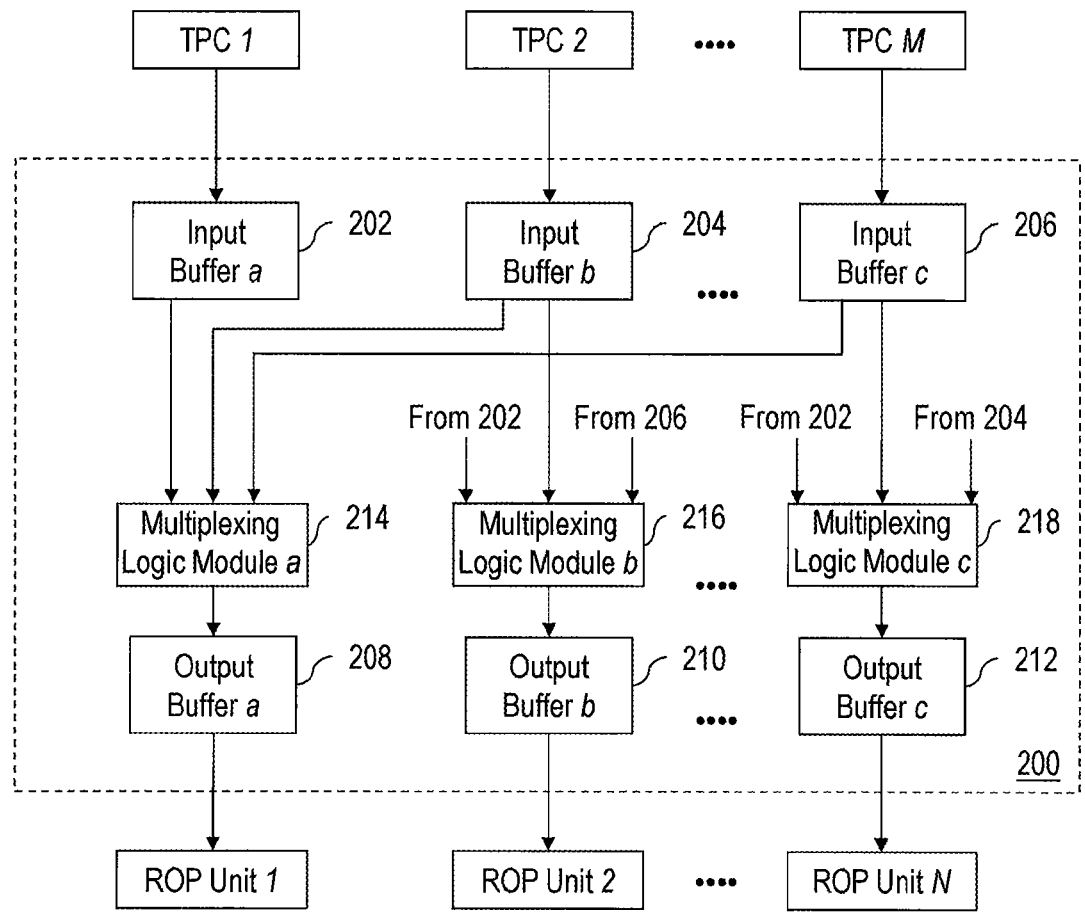
FIG. 2 is a simplified block diagram of a crossbar, according to one embodiment of the present invention.

FIG. 2 is a simplified block diagram of a crossbar 200, according to one embodiment of the present invention. Specifically, crossbar 200 includes M input buffers, each corresponding to a TPC, N output buffers, each corresponding to a ROP unit, and N multiplexing logic modules, each corresponding an output buffer. The input buffers alleviate some of the undesirable blocking effects discussed above. For example, suppose the two transaction requests from both TPC 1 and TPC 2 are destined for ROP unit 1. These two transaction requests are first placed in input buffer a 202 and input buffer b 204, respectively. Even if crossbar 200 is configured to process the transaction request from TPC 1 ahead of the transaction request from TPC 2, TPC 2 is not blocked from continuing to send new transaction requests to input buffer b 204, as long as input buffer b 204 has available storage capacity. In one implementation, each of the input buffers is a first-in-first-out buffer.

In addition, each multiplexing logic module takes the outputs of all the input buffers of crossbar 200 as data inputs and sends a selected output to an output buffer. For instance, multiplexing logic module a 214 takes the outputs of input buffer a 202, input buffer b 204, and input buffer c 206 and sends the selected output data to output buffer a 208. Similarly, multiplexing logic module b 216 and multiplexing logic module c 218 send the selected output data to output buffer b 210 and output buffer c 212, respectively. The use of the output buffers helps to eliminate the aforementioned bubbles. As an illustration, suppose all the TPCs request to send data to ROP unit 1 in the current clock cycle. If output buffer b 210 and output buffer c 212 contain previously stored transaction requests, then ROP unit 2 and ROP unit N can process these stored transaction requests during the current clock cycle and will not be idle. As a result, the bubbles are not formed. In one implementation, each of the output buffers is a first-in-first-out buffer. Moreover, the selection signals for the multiplexing logic modules are generated by the arbitration logic of crossbar 200 (not shown in FIG. 2), which may adopt any number of algorithms for routing data from M sources to N destinations, such as, without limitation, the round-robin algorithm.

Figure 3:
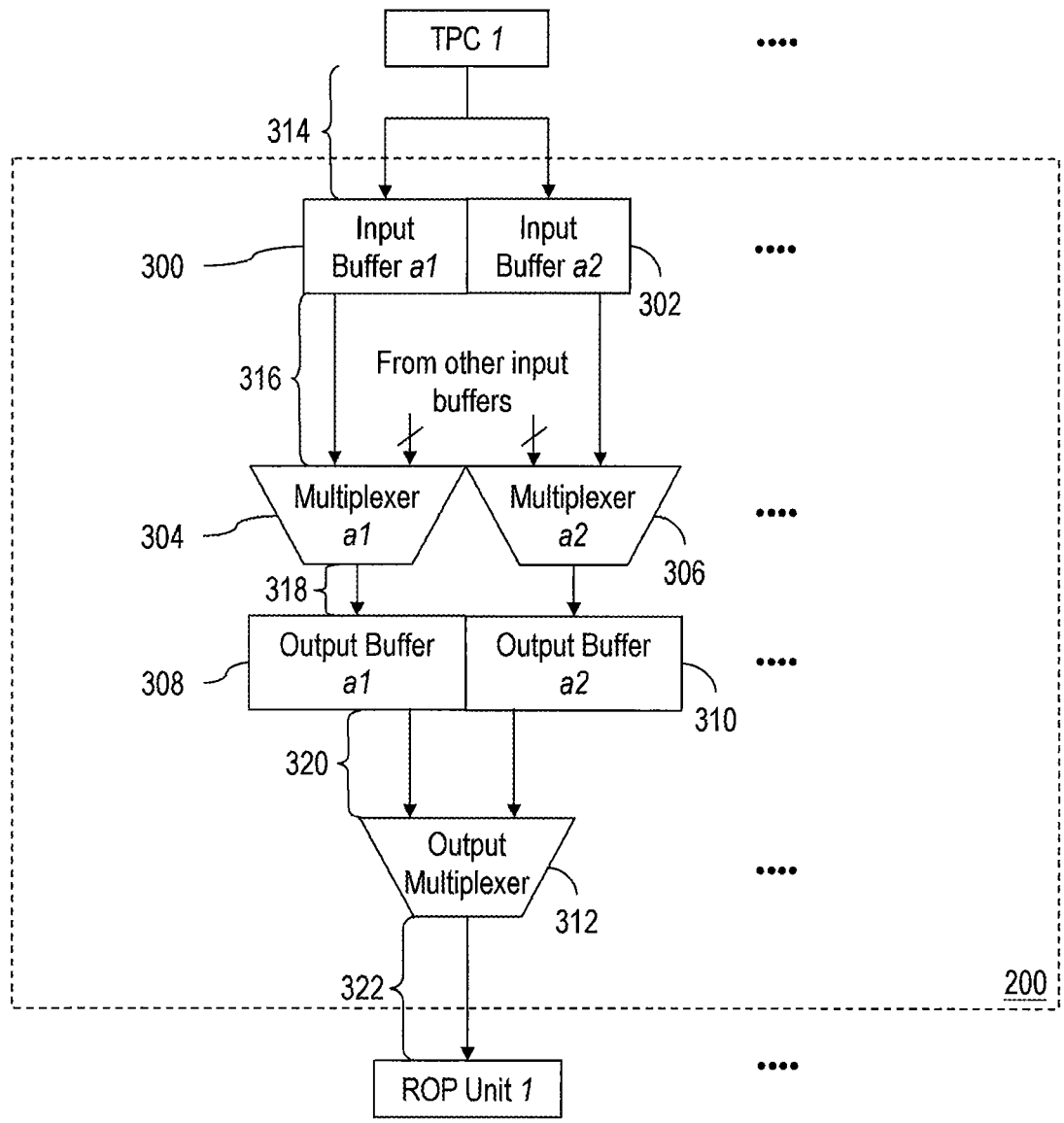
FIG. 3 is a simplified block diagram of a subset of components within a crossbar, according to one embodiment of the present invention.

To further explain the operating mechanism of crossbar 200, FIG. 3 is a simplified block diagram of a subset of components within crossbar 200, according to one embodiment of the present invention. Specifically, this subset includes two input buffers of equal width (i.e., input buffer a1 300 and input buffer a2 302), two multiplexers (i.e., multiplexer a1 304 and multiplexer a2 306), two output buffers (i.e., output buffer a1 308 and output buffer a2 310), and an output multiplexer, 312. Referring to FIG. 2, input buffer a1 300 and input buffer a2 302 correspond to input buffer a 202; multiplexer a1 304 and multiplexer a2 306 correspond to multiplexing logic module a 214; output buffer a1 308, output buffer a2 310, and output multiplexer 312 correspond to output buffer a 208.

Each of input buffer a1 300 and input buffer a2 302 receives one transaction request at a time from TPC 1. In one implementation, TPC 1 follows an alternating sequence of sending the transaction requests to the two buffers. For instance, TPC 1 may send the first transaction request to input buffer a1 300, the second transaction request to input buffer a2 302, the third transaction request back to input buffer a1 300, and so on and so forth. Because only one transaction request is being transmitted in a single clock cycle, the throughput for TPC output 314 is denoted as "1x" in the following paragraphs. However, it should be apparent to one with ordinary skill in the art to apply methods other than the described alternating sequence of transmission and yet still yield the 1x throughput.

After having stored the transaction requests from TPC 1, the two input buffers (i.e., 300 and 302) send the stored data to the multiplexers (i.e., 304 and 306, respectively) in parallel. In other words, here two transaction requests are transferred in a single clock cycle. Thus, the throughput at buffer output 316 is increased to "2x," as denoted in the following paragraphs. Similarly, because the two multiplexers and the two output buffers (i.e., 308 and 310) also operate in parallel, the throughput at multiplexed output 318 and buffer output 320 are both 2x. Since the input buffers of crossbar 200 receive incoming transaction requests at a rate that is half of the throughput of draining the already stored transaction requests, the input buffers do not fill up quickly. As mentioned above, as long as the input buffers have sufficient capacity to store the incoming stream of data, blocking among the TPCs should not occur. Although the discussions above describe a mechanism that results in the data outflow rate that doubles the data inflow rate for the input buffers of crossbar 200, it should be apparent to a person with ordinary skill in the art that modifications of the input/output ratio of the described mechanism do not exceed the scope of the claimed invention. For example, instead of doubling the data inflow rate, a person with ordinary skill in the art may use three input buffers of equal width to cause the input buffers of crossbar 200 to drain the stored data at a rate that triples the data inflow rate.

As the stored data from the input buffers are being drained and routed to the output buffers of crossbar 200, output multiplexer 312 selects and sends a stored transaction request from one of the two output buffers (i.e., 308 and 310) to ROP unit 1. Here, only one transaction request is transferred within a single clock cycle, so the throughput at multiplexed output 322 is throttled back to 1x. Because the output buffers of crossbar 200 receive incoming transaction requests at a rate that is twice the throughput of sending the stored data to ROP unit 1, the output buffers should maintain a sufficient amount of data to avoid forming bubbles among the ROP units.

As shown above, since the data stored in the input buffers are drained quickly, but the data stored in the output buffers are not, one implementation of crossbar 200 designates different buffer sizes for the input and output buffers. In particular, the buffer size for each output buffer is larger than the buffer size of each input buffer. In addition, for design flexibility purposes, the buffer size for either the input buffers or the output buffers can be modified.

In one embodiment, the relationships among the subset of components discussed above are duplicated across the entire crossbar 200. For example, each of input buffer b 204 and input buffer c 206 may also correspond to two input buffers as discussed above; multiplexing logic module b 216 may correspond to two multiplexers; output buffer b 210 may correspond to two output buffers and an output multiplexer. Moreover, in one implementation, M equals to 8, and N equals to 6.

Furthermore, one embodiment of crossbar 200 also adopts a number of routing policies for various types of input data. One type of input data is a multi-cycle transaction request. In dealing with this type of data, the input buffers of crossbar 200 are required to wait until the entire transaction request is resident before such a request can be transmitted through the rest of crossbar 200. As an illustration, suppose an incoming transaction request requires 8 clock cycles to convey. Input buffer a1 300 and input buffer a2 302 of FIG. 3 wait for 8 clock cycles so that the entire multi-cycle transaction request is resident. Using the aforementioned 1x throughput at TPC output 314 and the 2x throughput at buffer output 316 as an example, this multi-cycle data can then be routed to the output buffers in 4 clock cycles. Another type of input data is a state bundle. If one of the input buffers of crossbar 200 receives a state bundle, then the rest of the input buffers are stalled until that same state bundle is resident in each input buffer. After all the input buffers contain the same state bundles at the same positions within the input buffers (e.g., at the bottom of the input buffers and are about to be evicted), crossbar 200 is then responsible for broadcasting the state bundles to all the ROP units by placing a copy of the state bundle in each of the output buffers. It should be apparent to a person with ordinary skill in the art to implement routing policies other than the ones disclosed without exceeding the scope of the claimed invention.

Figure 4:
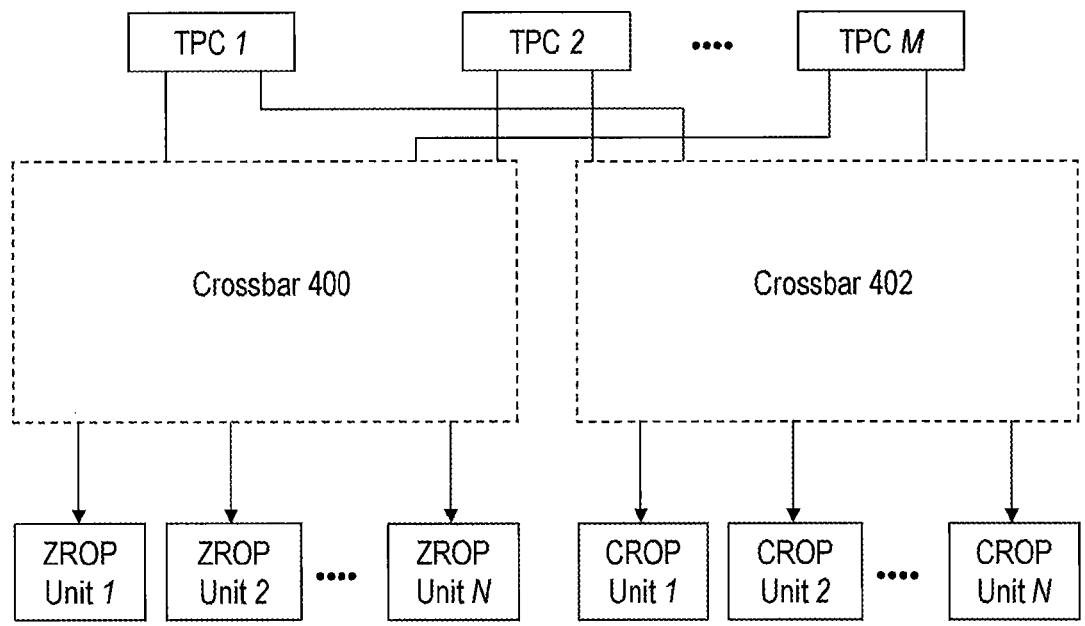
FIG. 4 is a simplified block diagram of a graphics system with multiple crossbars, according to one embodiment of the present invention.

FIG. 4 is a simplified block diagram of a graphics system with multiple crossbars, according to one embodiment of the present invention. Specifically, in this embodiment, the TPCs route the transaction requests involving depth values ("Z-values") and/or stencil attributes to crossbar 400 and route the transaction requests involving color values to crossbar 402. Both crossbars 400 and 402 include components that are illustrated in FIG. 2 and FIG. 3 and described above. Crossbar 400 is responsible for routing the Z-values and the stencil data from M number of TPCs to N number of Z-Raster OPerations ("ZROP") units, and crossbar 402 is responsible for routing the color values also from M TPCs to N Color-Raster OPerations ("CROP") units. In one implementation, each input buffer in crossbar 400 is sized to store 24 transaction requests, and each output buffer in crossbar 400 is sized to store 84 transaction requests. In addition, each input buffer in crossbar 402 is sized to store 48 transaction requests, and each output buffer in crossbar 402 is sized to store 128 transaction requests.

Figure 5:
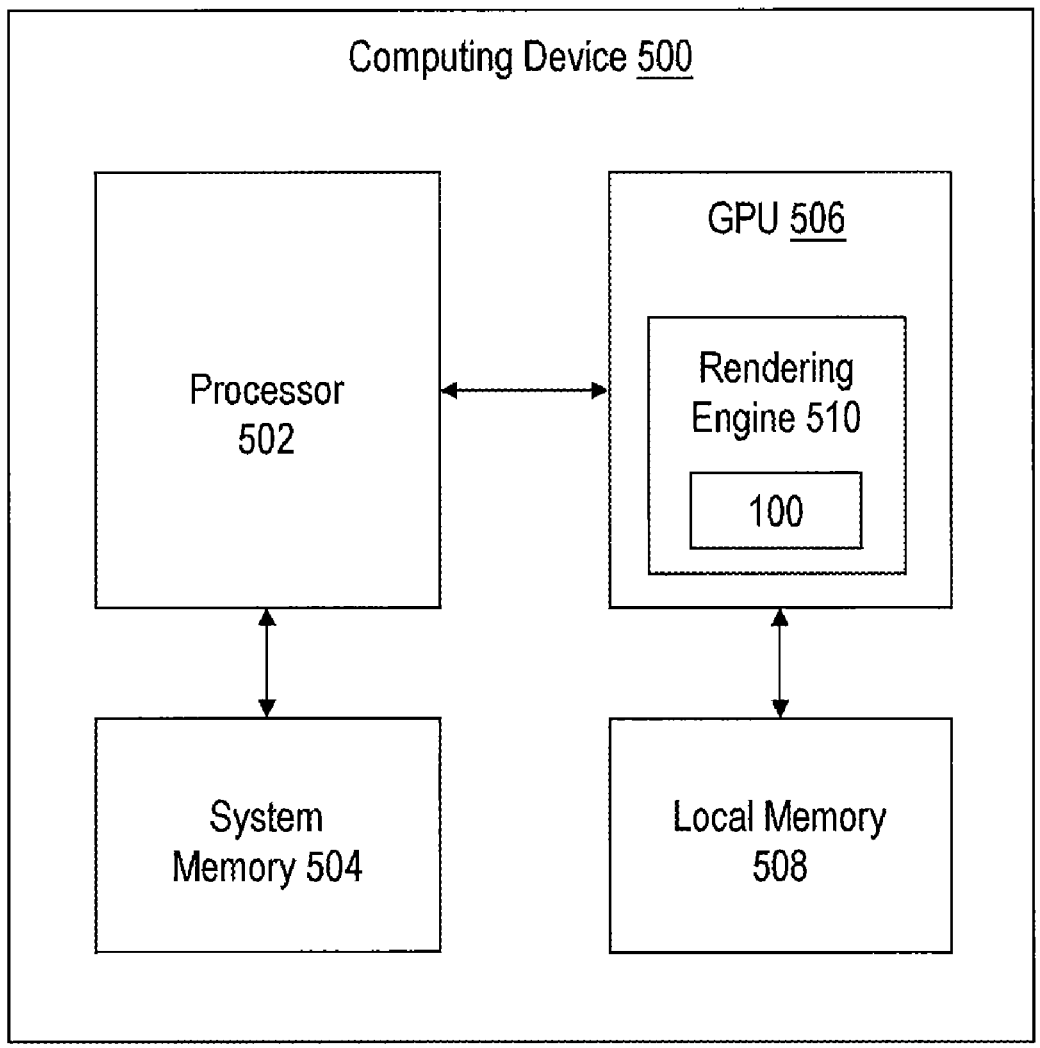
FIG. 5 is a conceptual diagram of a computing device configured to implement one or more embodiments of the present invention.

FIG. 5 is a conceptual diagram of a computing device configured to implement one or more embodiments of the present invention. Computing device 500 includes, without limitation, processor 502, system memory 504, graphics processing unit ("GPU") 506 and local memory 508 coupled to GPU 506. GPU 506 includes at least one rendering engine 510 used to process data. Rendering engine 510 includes at least one graphics rendering pipeline 100, as described above, that implements the crossbar described in FIGS. 2-4 and elsewhere herein. Persons skilled in the art will recognize that any system having one or more processing units configured to implement the teachings disclosed herein falls within the scope of the present invention. Thus, the architecture of computing device 500 in no way limits the scope of the present invention.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A method for transmitting data in a highly-parallel processing architecture, comprising:
receiving multimedia data from a first source operating in a first stage in a pipeline at a first throughput, wherein the first stage involves shading or texturing operations;
storing the multimedia data in a first input buffer corresponding to the first source;
routing the multimedia data from the first input buffer to a first output buffer corresponding to a first destination at a second throughput; and
routing the multimedia data from the first output buffer to the first destination operating in a second stage in the pipeline at the first throughput.

2. The method of claim 1, wherein the second throughput is greater than the first throughput.

3. The method of claim 1, wherein the first input buffer further comprises multiple buffers of equal widths.

4. The method of claim 1, wherein the first output buffer further comprises multiple buffers of equal widths.

5. The method of claim 1, further comprising writing the multimedia data to a partition in a frame buffer corresponding to the first destination.

6. The method of claim 1, further comprising selecting the multimedia data among a plurality of the first input buffers operating in parallel to route to a plurality of the first output buffers.

7. The method of claim 6, further comprising:
selecting the multimedia data among the plurality of the first input buffers and a plurality of second input buffers corresponding to a second source operating in the first stage in the pipeline.

8. The method of claim 6, wherein the multimedia data comprises multi-cycle multimedia data, the method further comprising:
storing all of the multi-cycle multimedia data before considering to route the multi-cycle multimedia data to the plurality of the first output buffers.

9. The method of claim 6, further comprising:
for the multimedia data containing the state information of the pipeline, stalling the plurality of the first input buffers until all of the plurality of the first input buffers contain the state information.

10. The method of claim 6, wherein the first stage in the pipeline involves texturing operations, and the second stage in the pipeline involves raster operations.

11. A crossbar in a highly-parallel graphics processing system, comprising:
a first input buffer corresponding to a first source operating in a first stage in a pipeline, wherein the first stage involves shading or texturing operations; and
a first output buffer corresponding to a first destination operating in a second stage in the pipeline, wherein
the first input buffer stores multimedia data from the first source at a first throughput;
the multimedia data from the first input buffer are routed to the first output buffer at a second throughput; and
the multimedia data from the first output buffer are routed to the first destination at the first throughput.

12. The crossbar of claim 11, wherein the second throughput is greater than the first throughput.

13. The crossbar of claim 11, wherein the first input buffer further comprises multiple buffers of equal widths, and the first output buffer further comprises multiple buffers of equal widths.

14. The crossbar of claim 11, further comprising:
a first multiplexer to select the multimedia data among a plurality of the first input buffers operating in parallel to route to a plurality of the first output buffers; and
an output multiplexer to select the multimedia data among the plurality of the first output buffers to route to the first destination.

15. The crossbar of claim 14, wherein a plurality of the first multiplexers select the multimedia data among the plurality of the first input buffers and a plurality of second input buffers corresponding to a second source operating in the first stage in the pipeline.

16. The crossbar of claim 14, wherein the multimedia data comprises multi-cycle multimedia data and the plurality of the first input buffers store all of the multi-cycle multimedia data before considering to route the multi-cycle multimedia data to the plurality of the first output buffers.

17. The crossbar of claim 14, wherein if one of the plurality of the first input buffers receives the multimedia data containing the state information of the pipeline, then the rest of the plurality of the first input buffers is stalled until all of the plurality of the first input buffers contain the state information.

18. The crossbar of claim 14, wherein the first source performs texturing operations, and the first destination performs raster operations.

19. The crossbar of claim 14, further comprising an arbitration module, wherein the arbitration module asserts select signals for the plurality of the first multiplexers and the output multiplexer.

20. A computing device configured to perform parallel operations, the computing device comprising:
   a memory; and
   a processing unit that includes a configurable graphics rendering pipeline utilizing a crossbar, wherein the crossbar includes:
   a first input buffer corresponding to a first source operating in a first stage in the graphics rendering pipeline, wherein the first stage involves shading or texturing operations; and
   a first output buffer corresponding to a first destination operating in a second stage in the graphics rendering pipeline, wherein
   the first input buffer stores multimedia data from the first source at a first throughput;
   the multimedia data from the first input buffer are routed to the first output buffer at a second throughput; and
   the multimedia data from the first output buffer are routed to the first destination at the first throughput.

* * * * *